(12) United States Patent
Colano (10) Patent No.: US 7,114,739 B2
(45) Date of Patent: Oct. 3, 2006

(54) ADJUSTABLE PASSENGER FLOORBOARDS

(76) Inventor: Richard V. Colano, 30142 Arrow Dr., Burlington, WI (US) 53105

( * ) Notice: Subject to any disclaimer, the term of this patent is extended or adjusted under 35 U.S.C. 154(b) by 0 days.

(21) Appl. No.: 11/058,658

(22) Filed: Feb. 15, 2005

(65) Prior Publication Data
US 2006/0181054 A1 Aug. 17, 2006

(51) Int. Cl.
*B62J 25/00* (2006.01)
(52) U.S. Cl. .................. 280/291; 280/166; 74/564; 296/75
(58) Field of Classification Search ........... 280/291, 280/166; 74/564; 296/75
See application file for complete search history.

(56) References Cited

U.S. PATENT DOCUMENTS

| | | | |
|---|---|---|---|
| 3,894,442 A | 7/1975 | Hembree | |
| 4,061,051 A * | 12/1977 | Grandis | ............... 74/473.16 |
| 4,083,263 A | 4/1978 | Lundquist | |
| 4,174,852 A * | 11/1979 | Panzica et al. | ............. 280/291 |
| 4,470,321 A | 9/1984 | Girty | |
| 4,633,727 A | 1/1987 | Pike | |
| 4,779,481 A * | 10/1988 | Natzke et al. | ............ 74/512 |
| 4,802,684 A | 2/1989 | Bennett et al. | |
| 5,661,999 A * | 9/1997 | Carone | ............... 74/473.16 |
| 5,720,359 A | 2/1998 | Attenello | |
| D405,393 S | 2/1999 | Stahel | |
| 6,003,407 A | 12/1999 | Cavalier | |
| 6,217,050 B1 * | 4/2001 | Dickie et al. | ............. 280/291 |
| 6,394,214 B1 | 5/2002 | Hahm | |
| 6,578,652 B1 * | 6/2003 | Kobacker et al. | ........ 180/219 |
| 6,688,629 B1 * | 2/2004 | Essinger | ............. 280/291 |
| 6,719,316 B1 | 4/2004 | Anthony | |
| 2005/0012300 A1 | 1/2005 | Egan | |

* cited by examiner

Primary Examiner—Lesley D. Morris
Assistant Examiner—Marlon Arce-Diaz
(74) Attorney, Agent, or Firm—Jansson, Shupe, Munger & Antaramian, Ltd.

(57) ABSTRACT

The motorcycle foot support assembly has a foot support member, a rotation arm, a monolithic motorcycle-mounting bracket, and a releaseable bracket-to-arm locking mechanism. The rotation arm is attached between the inner surface of the foot support and the motorcycle-mounting bracket. The monolithic motorcycle-mounting bracket has a motorcycle-attachment portion and an arm-attachment portion, the latter portion for engagement with the rotation arm. The releaseable bracket-to-arm locking mechanism has an engagement pin that selectively engages with one of a plurality of predetermined stop holes whereby the releaseable bracket-to-arm locking mechanism may be selectively engaged to stop the relative rotation between the arm-attachment portion and the rotation-arm first end.

17 Claims, 11 Drawing Sheets

ADJUSTABLE PASSENGER FLOORBOARDS

FIELD OF THE INVENTION

This invention is related generally to motorcycles and, more particularly, to passenger foot supports.

BACKGROUND OF THE INVENTION

Larger motorcycles are frequently designed for long-distance touring. When used in a touring mode, a passenger frequently rides along with the operator of the motorcycle.

To provide a modicum of passenger comfort, touring motorcycles are typically provided with passenger pegs which allow the passenger to have a foot support upon which to rest his or her feet while riding on a touring motorcycle.

Unfortunately, such foot pegs are placed at a generic location preselected during the manufacturing process and irrespective of the needs of a particular passenger. Such foot pegs, obviously do not take into account relative leg length differences extent within the general population. It would be valuable to provide a passenger foot support which is customizable with regard to height, longitudinal direction, and foot angle.

OBJECTS OF THE INVENTION

It is an object of the invention to provide an improved passenger floorboard overcoming some of the problems and shortcomings of the prior art, including those referenced above.

It is an object of the invention to provide a passenger floorboard with a position easily customizable.

It is another object of the invention to provide a passenger floorboard that is easily repositionable.

It is yet another object of the invention to provide a passenger floorboard that may be locked in place.

It is another object of the invention to provide a passenger floorboard which allows a passenger to choose from several discrete height adjustments.

It is yet another object of the invention to provide a customizable passenger floorboard that allows for discrete longitudinal positioning with respect to the motorcycle.

It is another object of the invention to provide a passenger floorboard that can be retracted to a stored position when not in use by a passenger.

It is another object of the invention to provide passenger floorboard that allows for customization of the foot-repose angle with respect to the horizontal.

How these and other objects are accomplished will become apparent from the following descriptions and from the drawings.

SUMMARY OF THE INVENTION

One embodiment of the invention involves a motorcycle foot support assembly. The motorcycle foot support assembly comprises a foot support member, a rotation arm, and a motorcycle-mounting bracket. The foot support member has an upper surface and an inner surface. The rotation arm is typically elongated having two ends, which are typically opposite and remote from each other. One of the ends of the rotation arm is attached with respect to the inner surface of the foot support. The motorcycle-mounting bracket is monolithic. The motorcycle-mounting bracket has a motorcycle-attachment portion and an arm-attachment portion. The arm attachment portion is pivotably attached with respect to the other end of the rotation arm.

In certain desired embodiments, the motorcycle foot support assembly further comprises a releaseable bracket-to-arm locking mechanism. Through engagement of this bracket-to-arm locking mechanism, the relative rotation between the arm-attachment portion and the rotation-arm first end may be selectively stopped and held in that particular position for the comfort of the riding passenger.

In some highly preferred embodiments, the locking mechanism has an engagement pin with a pin shape that selectively engages with one of a plurality of predetermined stop holes of a stop-hole shape complementary to the pin shape of a portion of the engagement pin.

In particular embodiments, at least three of the predetermined stop holes are arcuately located.

In other particular embodiments, the locking pin member is potentially biased to be engaged. In this way, to change the position of the locking arm with respect to the bracket, positive energy must be applied to the locking pin to disengage.

With these embodiments, it is preferred that the upper surface is substantially planar with a longitudinal dimension and a lateral dimension. In such embodiments, longitudinal dimension is parallel with a major axis of the motorcycle. By "major axis of the motorcycle" Applicant means the line running lengthwise from front to back of the motorcycle centered laterally with respect to the motorcycle, and generally running through the center of mass. In certain of these embodiments, it is highly preferred the longitudinal dimension is greater than the lateral dimension.

In other highly preferred embodiments, there is a rotation mechanism located between the second end and the foot-support inner surface. With these embodiments, it is more highly preferred to have a rotation-arresting mechanism for selectively arresting the rotation of the foot support member with respect to the rotation arm.

In another preferred embodiment, the rotation-arresting mechanism has an engagement peg with a peg shape that selectively engages with one of a plurality of predetermined stop apertures. The stop apertures have a stop-aperture shape complementary in shape to a portion of the peg. It is more preferred to have the engagement peg potentially biased to be engaged.

In other highly preferred embodiments, there is a rotatable retracting member between the inner surface and the rotation arm. In this way, the angle between a foot-support plane (described by the upper surface of the foot support member) and a motorcycle plane may be selectively decreased. As used herein, either of the terms "motorcycle plane" or "major motorcycle plane" refer to the plane that would contain both of the rotating wheels of the motorcycle when the motorcycle was being operated in an upright manner in a linear direction on a flat road surface, and to which the axes of rotation for each of the wheels would be perpendicular.

It is more preferable in certain applications for a portion of the upper surface to be non-slip. Such non-slip surfaces would include, but not be limited to, a rough surface created on the upper surface of the foot support through machining or through the application of material, such as rubber, to the surface or extending up through the upper surface.

In another preferred embodiment, the motorcycle foot support assembly also comprises a rotation mechanism. In such cases, it is preferable for the rotation mechanism to be located between the second end of the rotation arm and the inner surface of the foot support. It desirable in such application to have a rotation-arresting mechanism for selectively arresting the rotation of the foot support member with respect to the rotation arm. The rotation-arresting mechanism may be of the type using an engagement peg to selectively engage one of a plurality of predetermined stop apertures. In such cases the peg has a peg shape and the stop aperture has a stop-aperture shape that is complementary in shape to a portion of the peg.

It is a preferred embodiment for the engagement peg to be potentially biased to be engaged with the stop aperture.

It is another aspect of the invention to provide a repositionable footboard for motorcycles. The repositionable footboard comprises a footboard portion, an elongated crank, and a bracket member. The footboard portion has a planar upper surface. The planar surface of the footboard further has a longitudinal dimension parallel to the motorcycle plane and a lateral dimension. The lateral dimension that is not greater than the longitudinal dimension. The footboard also has an inner surface. The elongated crank has a first end and a second end. The second end of the crank is rotatably attached with respect to the inner surface of the footboard such that the footboard may rotate about a footboard axis of rotation that is substantially orthogonal to the major motorcycle plane. The bracket member is configured for attachment to the motorcycle. The bracket member is rotatably attached with respect to the first end in a manner such that it may rotate about a crank axis of rotation substantially orthogonal to the major motorcycle plane.

Some preferable embodiments further comprise a crank-to-bracket positioning mechanism and a crank-to-footboard position mechanism. The crank-to-bracket positioning mechanism selectively and releasably locks the rotation of the crank with respect to the bracket. The crank-to-footboard position mechanism selectively and releasably locks the rotation of the footboard with respect to the crank.

It is more preferable in certain embodiments for the footboard to describe a major footboard plane, which is at a footboard-to-motorcycle angle with respect to the major motorcycle plane. In these embodiments, a footboard retraction mechanism is provided, which allows the footboard to be selectively pivoted to change the footboard-to-motorcycle angle. Such position may then be locked.

BRIEF DESCRIPTION OF THE DRAWINGS

The drawings illustrate preferred embodiments which include the above-noted characteristics and features of the invention. The invention will be readily understood from the descriptions and drawings. In the drawings.

DETAILED DESCRIPTION OF PREFERRED EMBODIMENTS

Figure 1:
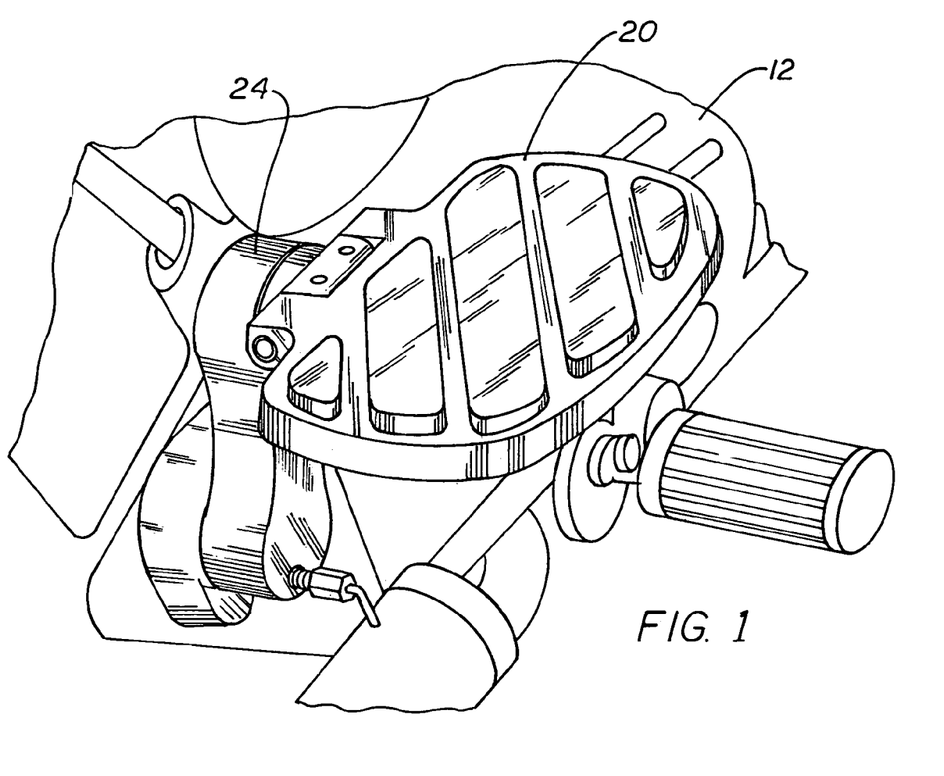
FIG. 1 is a perspective view of a footboard unit of the current invention mounted on a motorcycle.

As shown in FIG. 1, the footboard unit 10 is attached to the right side of a motorcycle 12. It will be noted at the outset that the description herein is for a footboard unit 10 configured for installation on the right side of motorcycle 12. It is expected that such footboard units 10 will be sold in pairs for installation on the right and left side of motorcycles 12 to accommodate the right and left legs of a passenger. It is easily observable to anyone skilled in the art from the diagrams and discussions herein that a footboard unit 10 configured for the left side of the motorcycle 12 will be a mirror image of that described and illustrated herein.

Footboard unit 10 may be grossly described as having four rigid components: footboard 20, horizontal positioning collar 22, positioning arm 24, and mounting bracket 26.

Figure 2A:
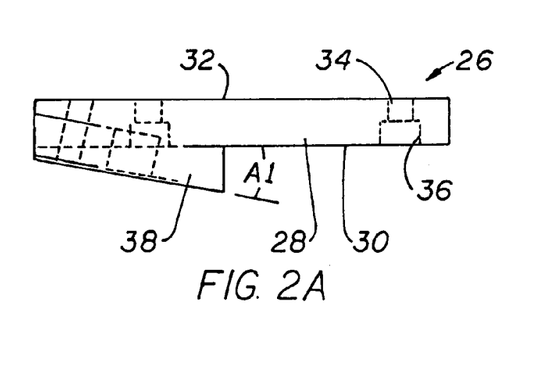
FIG. 2A is a top view of the mounting bracket.
Figure 2B:
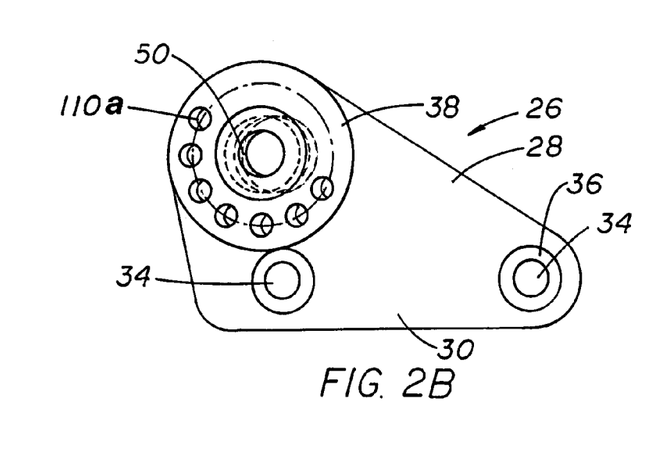
FIG. 2B is a front view of the mounting bracket of FIG. 2A (normal to the mounting portion front surface).
Figure 2C:
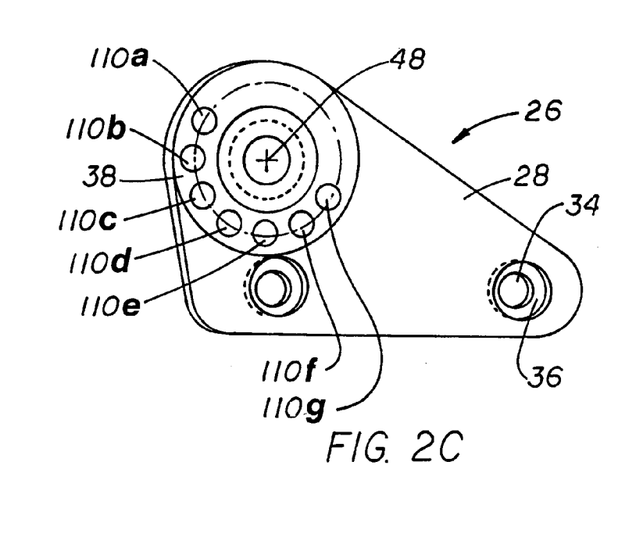
FIG. 2C is a front view of the mounting bracket of FIG. 2A (normal to the connecting surface).
Figure 2D:
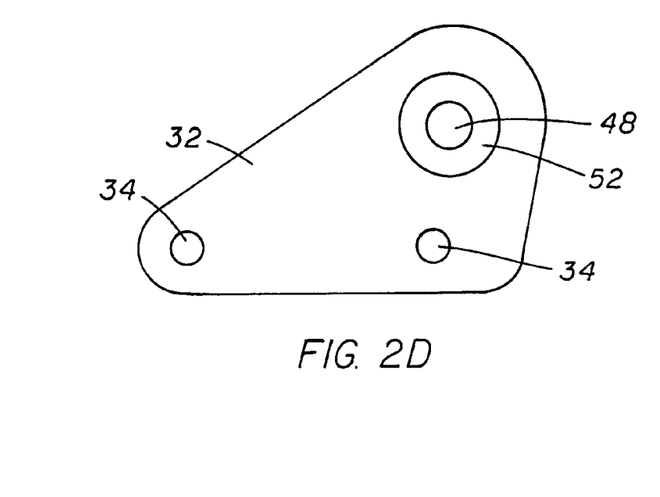
FIG. 2D is a back view of the mounting bracket of FIG. 2A.

As seen in FIGS. 2A, 2B, and 2C, mounting bracket 26 has a mounting portion 28. Mounting portion 28 is roughly trapezoidal in shape. Mounting portion 28 is generally plate-like with a front surface 30 and a back surface 32. Extending through mounting portion 28 are two mounting holes 34. Mounting holes 34 have countersunk portion 36 on the front end of holes 34. In this way, bracket 26 may be affixed to motorcycle 12 through a bolt (not shown) extending through mounting hole 34 to thread into motorcycle 12. The circumference of countersunk portion 36 is large enough to accommodate the bolt head and any tools (e.g., hexhead socket) necessary to tighten bolt head into engagement with motorcycle 12.

Integral with mounting portion 28 is connecting portion 38. As best seen in FIG. 2C, connecting portion 38 is substantially cylindrical. Moreover, connecting portion 38 has a connecting-portion front face 40. Connecting-portion front face 40 makes an angle $a_1$ with mounting-portion front face 30. Angle $a_1$ dispenses footboard 20 of assembled footboard unit 10 laterally from the side of motorcycle 12. It has been found that angle $a_1$ is advantageously fixed at 10°.

It is preferable that connecting portion 38 and mounting portion 28 be a solid casting from one piece of metal, but it will be easily recognized that the two portions could be of different pieces mechanically joined. Moreover, it is preferable that the piece be unitarily cast from aluminum for this metal's cost, weight, and polishability characteristics.

Figure 3A:
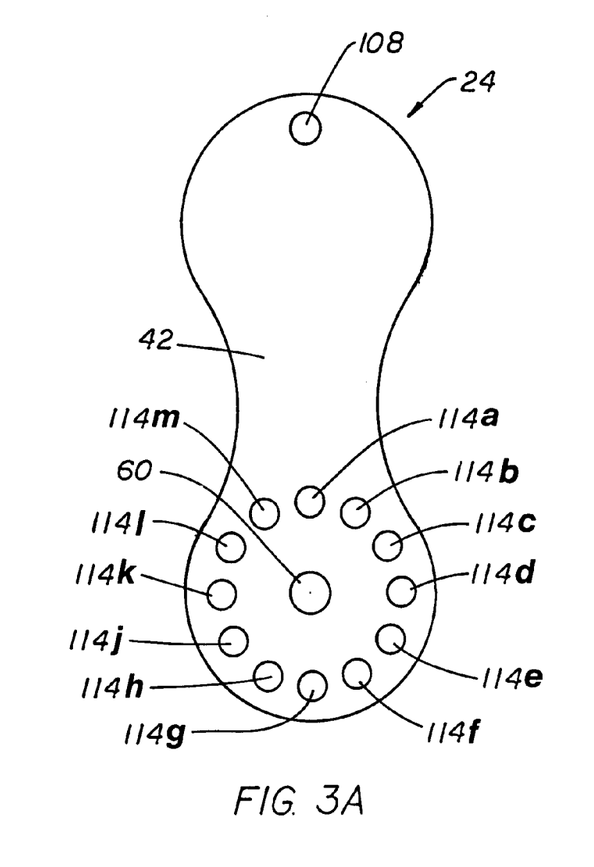
FIG. 3A is a front view of the positioning arm.
Figure 3B:
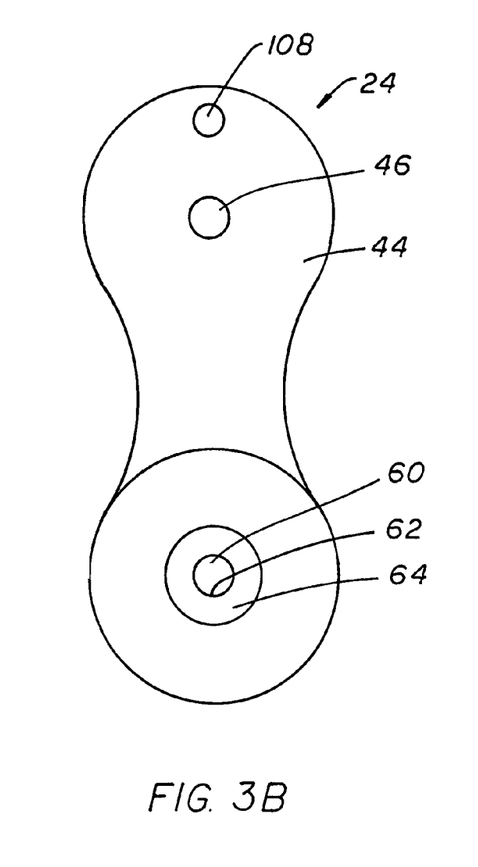
FIG. 3B is a back view of the positioning arm of FIG. 3A.

Turning to FIGS. 3A and 3B, positioning arm 24 is illustrated. Positioning arm 24 has a positioning-arm front surface 42 and positioning-arm back surface 44. Extending into positioning-arm back surface 44 is bracket-to-arm receiving hole 46. Bracket-to-arm receiving hole 46 is threaded. Positioning arm 24 is attached to bracket 26 by means of an Allen-head stub bolt 47. Allen-head stub bolt 47 is of the type having a flat hex-slot head with a smooth, unthreaded throat extending between the head and the threaded tail. Allen-head stub bolt 47 is configured such that when bolt is extended through bracket-to-arm aperture 48 on mounting bracket 26 Allen-head stub bolt 47 may be securely screwed into bracket-to-arm receiving hole 46 while the smooth throat may slide along interior surface 50 of bracket-to-arm aperture 48. Head of Allen-head stub bolt 47 remains totally below mounting-portion back surface 32 due to back surface countersink 52.

FIGS. 4A, 4B, 4C, and 4D depict horizontal-positioning collar 22. Horizontal-positioning collar 22 has a horizontal-positioning-collar front surface 54 and a horizontal-positioning-collar back surface 56.

Horizontal-positioning-collar back surface 56 is substantially circular. Extending into horizontal-positioning collar 22 at the center of horizontal-positioning back collar surface 56 is arm-to-collar receiving hole 58. Arm-to-collar receiving hole 58 is threaded. As best seen in FIGS. 3A and 3B, extending through positioning arm 24 is a arm-to-collar aperture 60. Arm-to-collar aperture wall 62 is smooth. At the back entry of arm-to-collar aperture 60 is arm-countersunk well 64.

In a manner similar to attachment of positioning arm 24 to mounting bracket 26 described above, horizontal-positioning collar 22 is attached to positioning arm 24 by means of an Allen-head stub bolt 65. Allen-head stub bolt 65 is urged through arm-to-collar aperture such that it may be threaded into engagement in arm-to-collar receiving hole 58. Allen-head stub bolt 65 is tightened in a manner such that the Allen-head is within the arm countersunk well 64 and is below positioning arm back surface 44. The attachment is configured such that a smooth portion 67 of the Allen-head stub bolt 65 will be adjacent to smooth arm-to-collar aperture walls 62 and will allow rotation of positioning arm about Allen-head stub bolt 65.

Figure 4A:
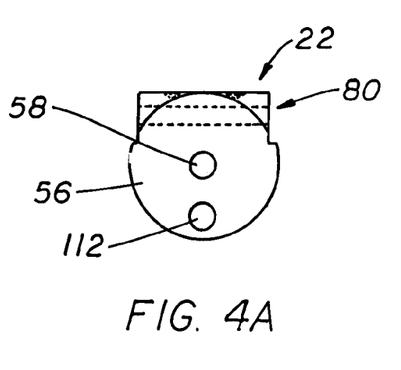
FIG. 4A is a back view of the horizontal positioning collar.
Figure 4B:
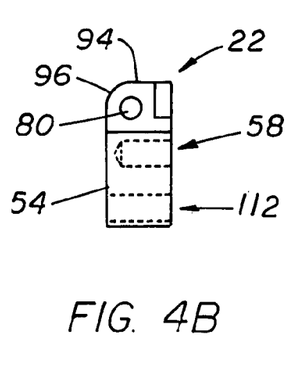
FIG. 4B is a side view of the horizontal positioning collar of FIG. 4A.
Figure 4C:
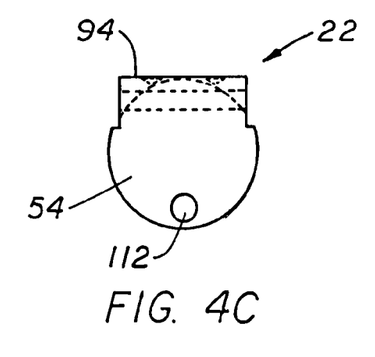
FIG. 4C is a front view of the horizontal positioning collar of FIG. 4A.
Figure 4D:
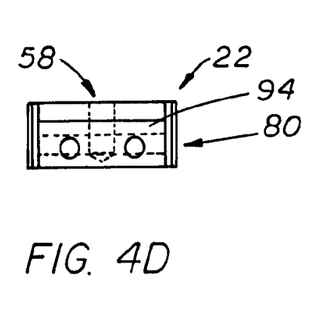
FIG. 4D is a top view of the horizontal positioning collar of FIG. 4A.
Figure 5:
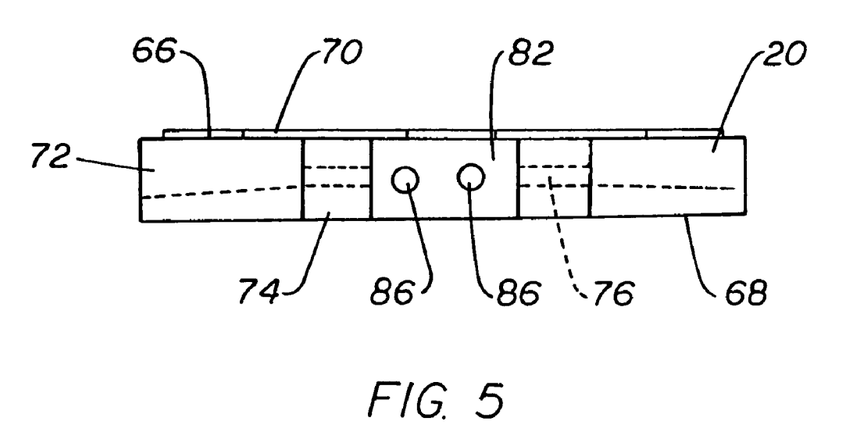
FIG. 5 is a back view of the footboard.

As seen in FIGS. 5A and 5B, footboard 20 is substantially plate-like having an upper surface 66 and a footboard lower surface 68. Footboard 20 is typically made of metal. To provide a non-slip surface for a passenger's foot, neoprene strips 70 are inlaid into complementary-shaped depressions in the footboard upper surface 66. As best seen in FIG. 5A, neoprene strips 70 extend up above footboard upper surface 66. In this way, the passenger's foot mainly encounters the non-skid surface provided by neoprene strips 70. It will be easily understood that the neoprene surface does not have to be provided in strip-like portions but could be provided in a continuous sheet. Moreover, it is easily recognized that other surface materials and configuration will make the surface non-skid. Moreover still, it will be easily recognized that the functionality of certain aspects of this invention are not dependent on the presence of a non-skid surface. Extending inwardly (laterally toward the motorcycle) from an inner side 72 are two attachment ears 74. Extending through each attachment ear 74 is footboard-pivot-rod channel 76. Pivot rod 78 extends through the footboard-pivot-rod channels 76 of both attachment ears 74 and positioning-collar-pivot-rod channel 80 (best seen FIGS. 4A–4D) thereby pivotably attaching footboard 20 to horizontal-positioning collar 22. Pivot rod 78 is retained in footboard-pivot-rod channel 76 and positioning-collar-pivot-rod channel 80 by cotter pins 81 at each end of pivot rod 78.

Figure 6:
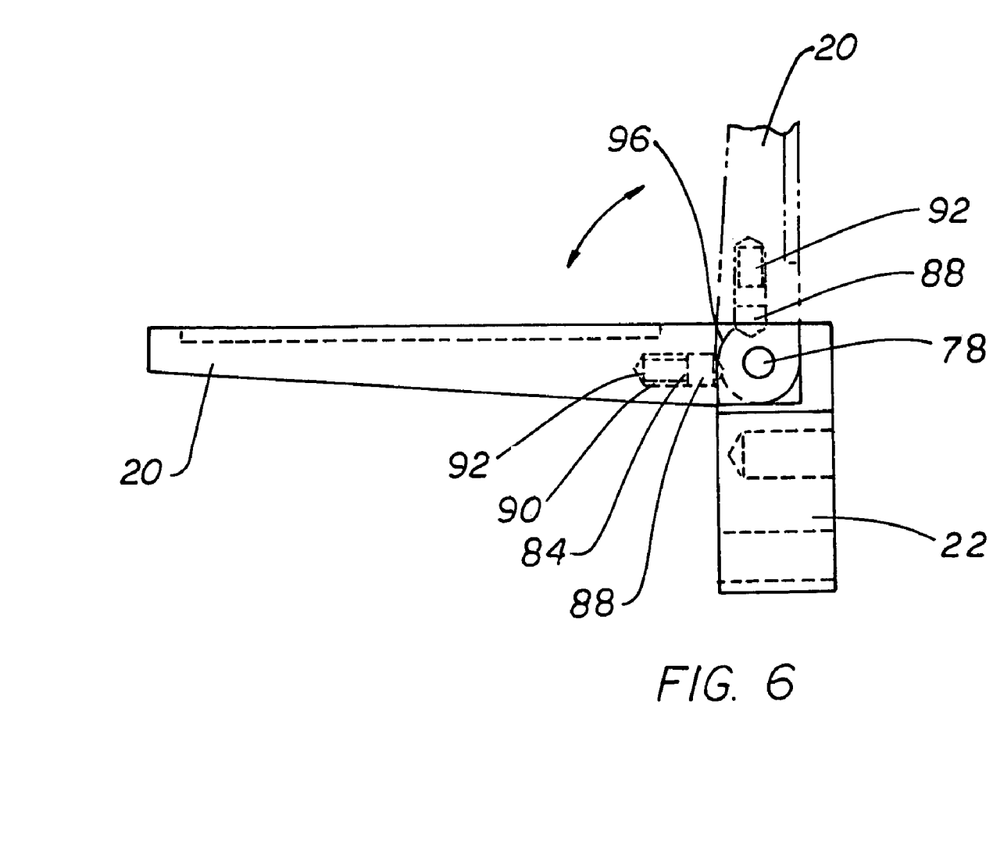
FIG. 6 is a side cross-sectional view of the footboard/horizontal positioning collar combination.
Figure 7:
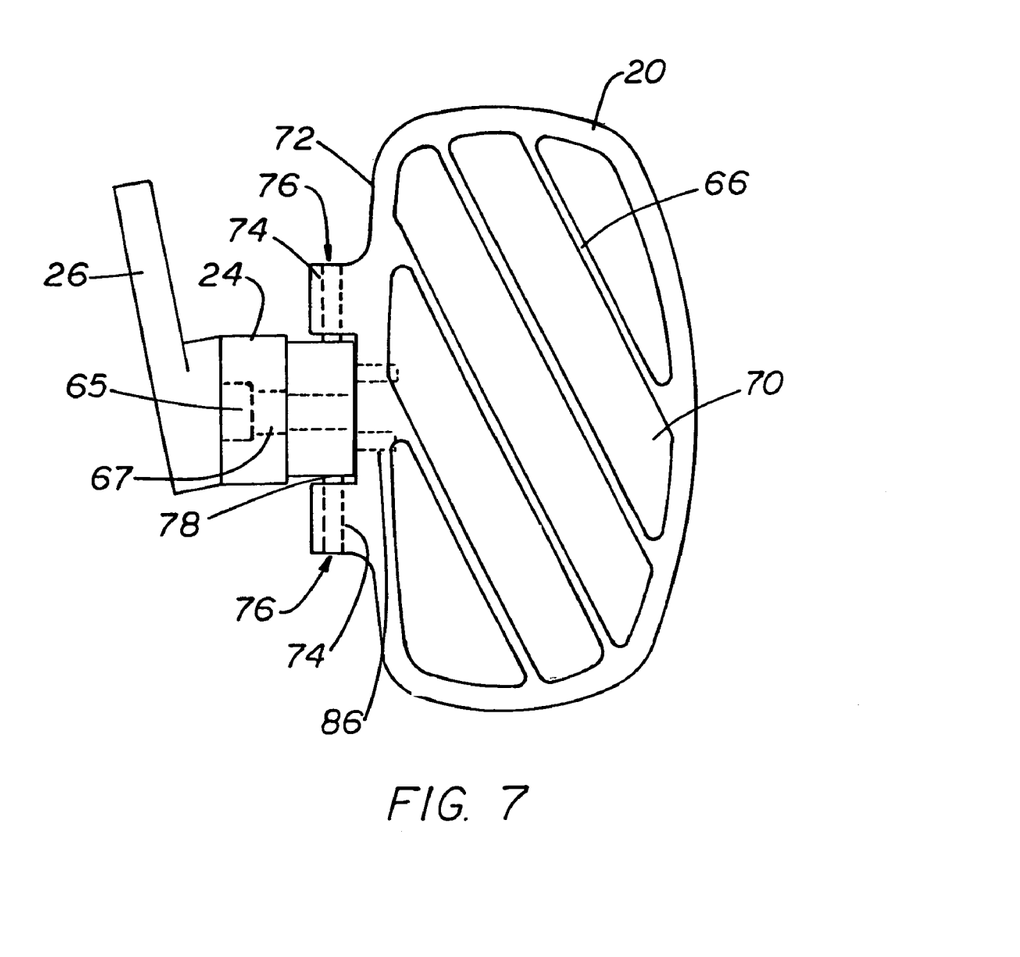
FIG. 7 is a top view of the footboard unit.

In the preferred embodiment illustrated, as best seen in FIGS. 6 and 7, when in a fully-deployed position, the general plane of the footboard 20 described by the footboard upper surface 66 is perpendicular to the horizontal-positioning collar front surface 54. Although the angle illustrated is 90°, the angle can be selectively determined by adjusting the manner of contact between footboard inter-ear surface 82 and horizontal-positioning collar front surface 54. In a like manner, footboard 20 may be rotated about pivot rod 78 into a retracted position such that the plane described by the footboard upper surface 66 in retracted position is parallel with horizontal-positioning collar front surface 54, which in turn is in parallel to the major motorcycle plane.

To maintain the retracted position of footboard 20 when motorcycle 12 is in operation from inadvertent deployment, provided are two stop pins 84 within stop-pin channels 86. Stop pins 84 have a spherical head portion 88 and a cylindrical tail portion 90. Stop pins 84 are potentially-loaded by spring 92 in a manner to push spherical head portion 88 out of stop-pin channels 86.

As best seen in FIGS. 4B, 4C, and 4D, horizontal positioning collar 22 has a horizontal-positioning-collar upper surface 94, which is perpendicular to horizontal-positioning-collar front surface 54. Despite the perpendicularity of the surfaces 54, 94, there is an arcuate transition-region surface 96. Into horizontal-positioning-collar upper surface 94 are two pin-receiving concavities 98. Pin-receiving concavities 98 have a spherical profile of radius similar to the radius of spherical head portion 88 to provide a receiving depression complementary in shape to spherical head portion 88, but less than hemispherical in scope.

In operation, when footboard 20 is deployed, most of spherical head portions 88 are restrained within stop-pin channels 86 by horizontal-positioning-collar front surface 54. As footboard 20 is rotated about pivot rod 78, spherical head portions 88 remain restrained in stop-pin channels 86 by arcuate transition-region surface 96 and then by horizontal-positioning-collar upper surface 94 as spherical head portions 88 smoothly slide along arcuate transition-region surface 96 toward footboard retraction position. As footboard 20 reaches retracted position, spherical head portions 88 are forced into interaction with pin-receiving concavities 98 by springs 92. The interaction between spherical head portions 88 and pin-receiving concavities 98 is sufficient to hold footboard 20 in the retracted position. Spring is chosen such that when it is desired to deploy footboard 20, hand pressure applied to footboard upper surface 66 is sufficient to force spherical head portions 88 out of interactive engagement with pin-receiving concavities 98, and urge footboard 20 into the deployed position.

As described above, positioning arm 24 rotates with respect to mounting bracket 26 about Allen-head stub bolt 47 connecting the two components. To stop the rotation at discrete points, a positioning-arm-to-mounting-bracket locking mechanism is provided. Positioning-arm-to-mounting-bracket locking mechanism includes threaded, position-arm spring-loaded lynch pin 100a. Position-arm spring-loaded lynch pin 100a has an L-shaped pin member 102 with a handle portion 104 and a connecting portion 106 perpendicular to the handle portion 104. Threaded, position-arm spring-loaded lynch pin 100a is threaded into arm locking aperture 108. Arm-locking aperture 108 is threaded to receive threaded, position-arm spring-loaded lynch pin 100a. Threaded, position-arm spring-loaded lynch pin 100a is inserted into positioning arm 24 such that handle portion 104 is on the position arm front surface side and connecting portion 106 extends through positioning arm 24 to engage one of arm locking holes 110a–g on connecting portion 38 (as best seen in FIGS. 2B and 2C); connecting portion 106 and arm locking holes 110a–g are of complementary shape. Arm locking holes 110a–g are each figured to slidingly engage connection portion 106 in a manner such that connecting portion 106 may be slidingly engaged and disengaged from arm locking holes 110a–g in a longitudinal direction along connection portion 106, but will resist any shear pressure (and hence rotational motion of positioning arm 24 with respect to mounting bracket 26). L-shaped pin member 102 is potentially biased to be in engagement with arm locking holes 110a–g.

In a similar manner, horizontal-positioning collar 22 rotates with respect to positioning arm 24 about Allen-head stub bolt 65 connecting the two components. To stop this rotation at discrete points, a horizontal-positioning-collar-to-positioning-arm locking mechanism similar to positioning-arm-to-mounting-bracket locking mechanism is provided. Horizontal-positioning-collar-to-positioning-arm locking mechanism also includes threaded, collar spring-loaded lynch pin 100b. Collar spring-loaded lynch pin 100b is as described above with regard to position-arm spring-loaded lynch pin 100a, with L-shaped pin member 102 with a handle portion 104 and connecting portion 106. Threaded, collar spring-loaded lynch pin 100b is threaded into collar locking aperture 112. Collar-locking aperture 112 is threaded to receive threaded, collar spring-loaded lynch pin 100b. Threaded, collar spring-loaded lynch pin 100b is inserted into horizontal positioning collar 22 such that handle portion 104 is on the horizontal positioning collar front surface side and connecting portion 106 extends through horizontal positioning collar 22 to engage one of collar locking holes 114a–m on positioning arm 24. Connecting portion 106 and collar locking holes 114a–m are of complementary shape. Collar locking holes 114a–m are each figured to slidingly engage connection portion 106 in a manner such that connecting portion 106 may be slidingly engaged and disengaged from collar locking holes 114a–m in a longitudinal direction along connection portion 106, but will resist any shear pressure (and hence rotational motion of horizontal-positioning collar 22 with respect to positioning arm 24). L-shaped pin member 102 is potentially biased to be in engagement with arm locking holes 114a–m.

In operation, footboard unit 10 is bolted to motorcycle 12. A passenger selects the preferred location of footboards (for both the right and left sides of motorcycle). Due to the particular design illustrated, the planes of rotation of horizontal-positioning collar 22 with respect to positioning arm 24 and of positioning arm 24 with respect to mounting bracket 26 are substantially coplanar, and coplanar with the general plane of motorcycle 12, and hence are vertical with respect to the roadway surface when motorcycle is in operation in a forward motion. This design allows passenger to choose both height and longitudinal position (front to back with respect to motorcycle 12 along the major motorcycle axis). It will be readily understood that deviating the plane of rotation of horizontal-positioning collar 22 with respect to positioning arm 24 through design, passenger will have the added positioning option of lateral position, although such option will in some usages give the motorcycle a wider lateral aspect, which may not for specific motorcycles be advantageous.

After choosing the position of footboard 20, positioning-arm lynch pin 100a is released allowing position arm to rotate about Allen-head stub bolt 47 joining position arm to mounting bracket, until position arm 24 is in the desired position. Once position arm 24 is in desired position, positioning-arm lynch pin 100a is re-engaged with the nearest arm locking hole 110a–g. Horizontality of footboard 20 is then obtained by passenger horizontality adjustment. To obtain horizontality, passenger releases collar lynch pin 100b to allow collar to rotate about Allen-head stub bolt 65 joining collar to position arm. Once horizontality of footboard 20 is obtained, collar lynch pin 100b is re-engaged with the nearest collar locking hole 114a–m. as illustrated, each of the twelve collar locking hole 114a–m is situated 30° from its nearest neighbor.

Figure 8A:
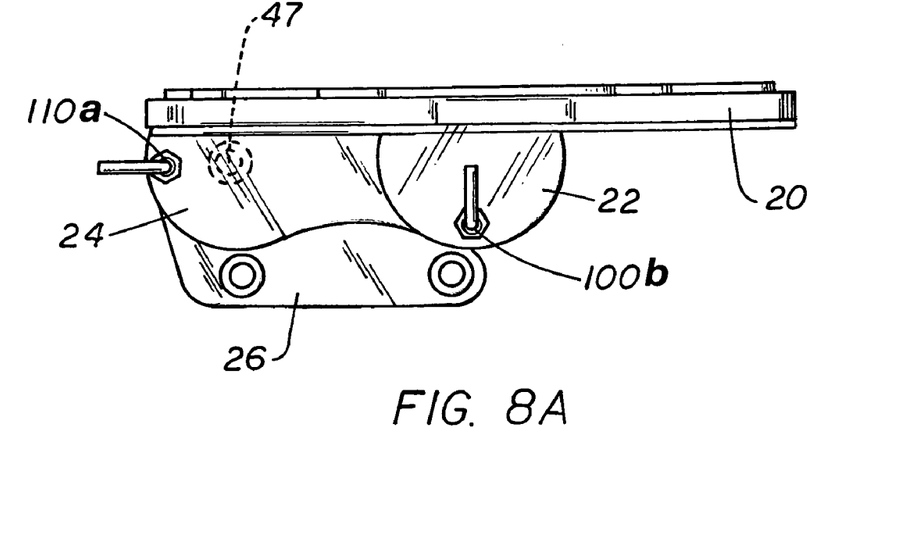
FIG. 8A is a front view of the footboard unit.
Figure 8B:
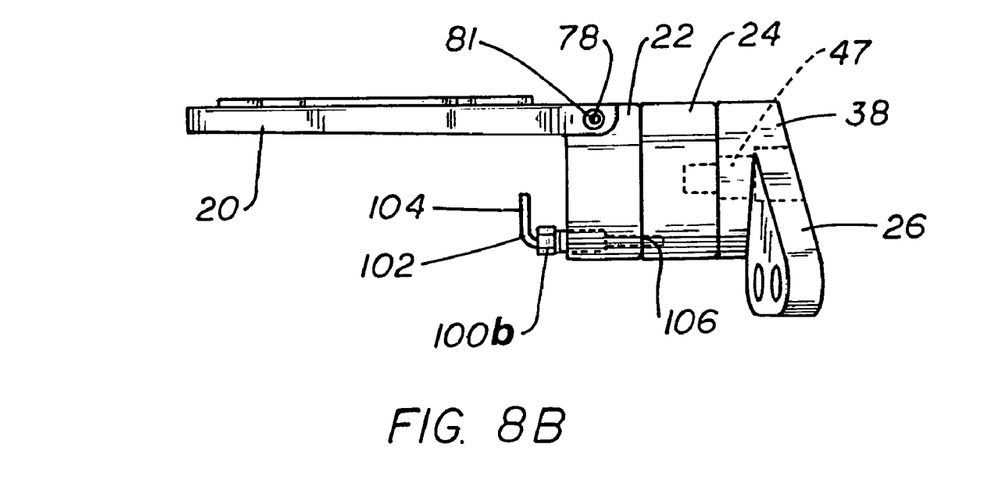
FIG. 8B is a side view of the footboard unit depicted in FIG. 8A.
Figure 9A:
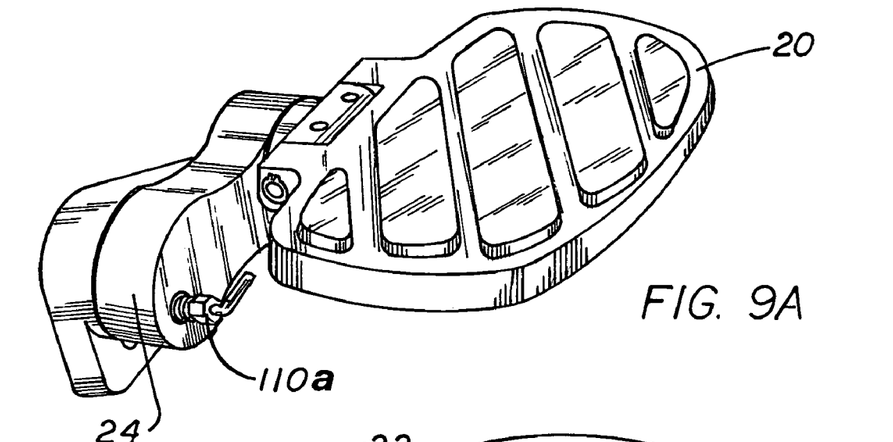
FIG. 9A is a perspective view of the footboard unit.
Figure 9B:
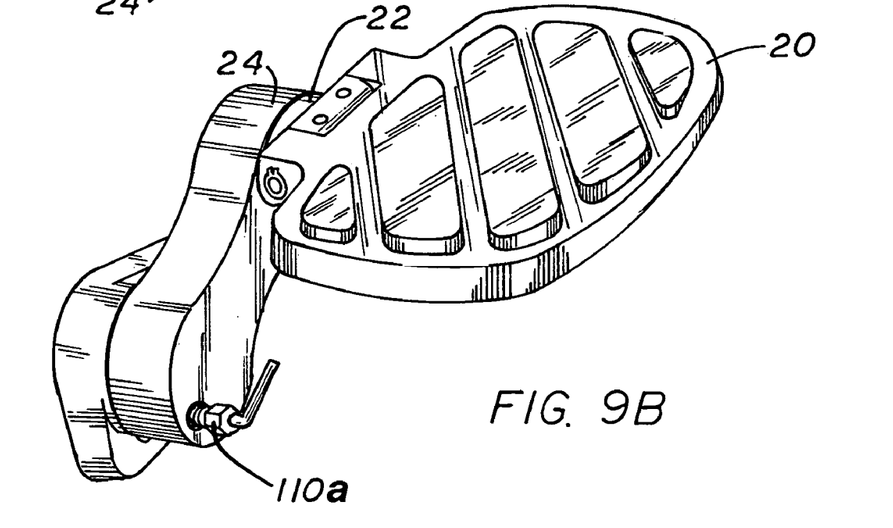
FIG. 9B is a perspective view of the footboard unit.
Figure 10A:
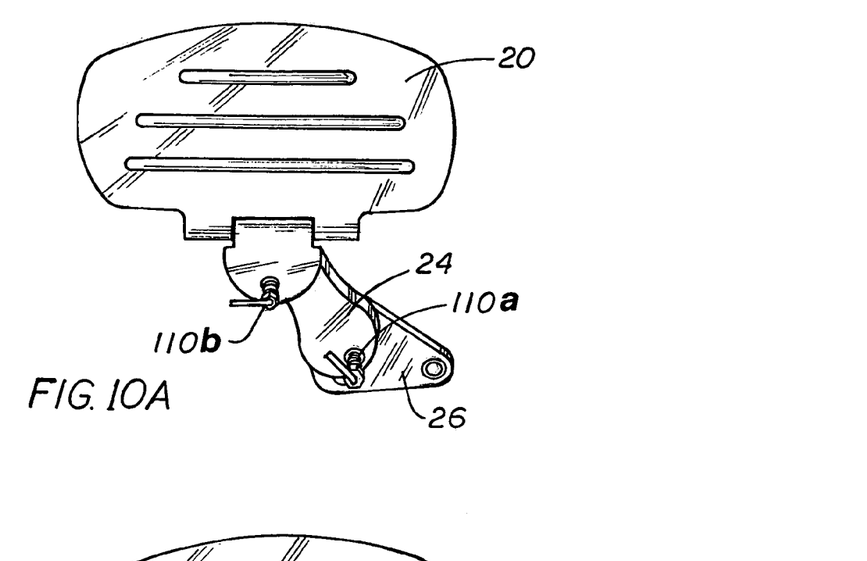
FIG. 10A is a front view of the footboard unit in a particular configuration.
Figure 10B:
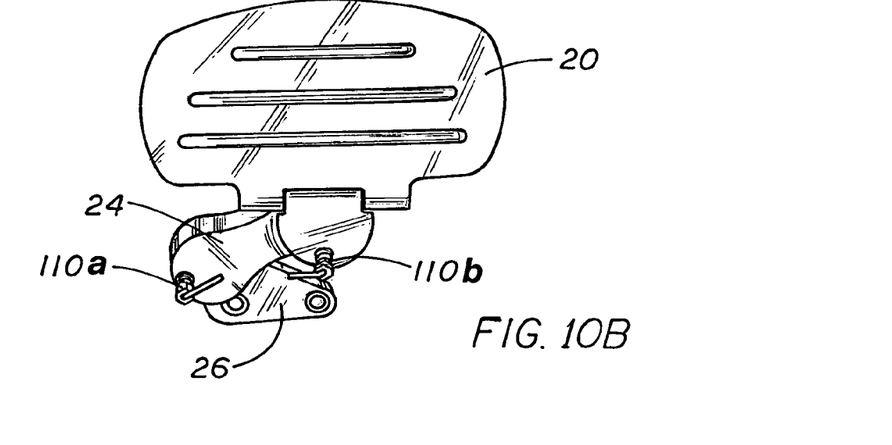
FIG. 10B is a front view of the footboard unit in a different configuration than depicted in FIG. 10A.

FIGS. 1, 8A, 8B, 9A, 9B, 10A, 10B, and 10C illustrate passenger-chosen placements. In FIGS. 8A, 8B, and 9A, positioning-arm lynch pin 100a engages arm locking hole 110b and collar lynch pin 100b engages arm locking hole 114k. In this orientation, footboard 20 is placed in the most forward position available from this design illustrated. In FIGS. 9B and 10B, an intermediate position is illustrated such that footboard 20 is at neither maximum height nor maximum forward position. In this position, positioning-arm lynch pin 100a engages arm locking hole 110c and collar lynch pin 100b engages arm locking hole 114l.

In FIG. 1, positioning-arm lynch pin 100a engages arm locking hole 110e and collar lynch pin 100b engages arm locking hole 114g, to obtain maximum height of positioned footboard 20.

In FIG. 10A, an intermediate position is illustrated such that footboard 20 is at neither maximum height nor maximum rearward position. In this position, positioning-arm lynch pin 100a engages arm locking hole 110g and collar lynch pin 100b engages arm locking hole 114b.

Figure 10C:
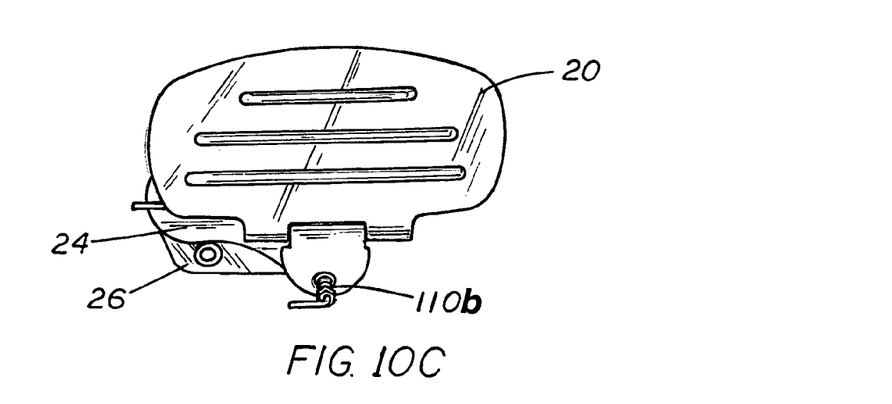
FIG. 10C is a front view of the footboard unit configured in a way different than depicted in FIGS. 10A and 10B.

In FIG. 10C, an intermediate position is illustrated such that footboard 20 is at a forward position, 30° below the horizon (for a longer-legged passenger). In this position, positioning-arm lynch pin 100a engages arm locking hole 110a and collar lynch pin 100b engages arm locking hole 114j.

Figure 11:
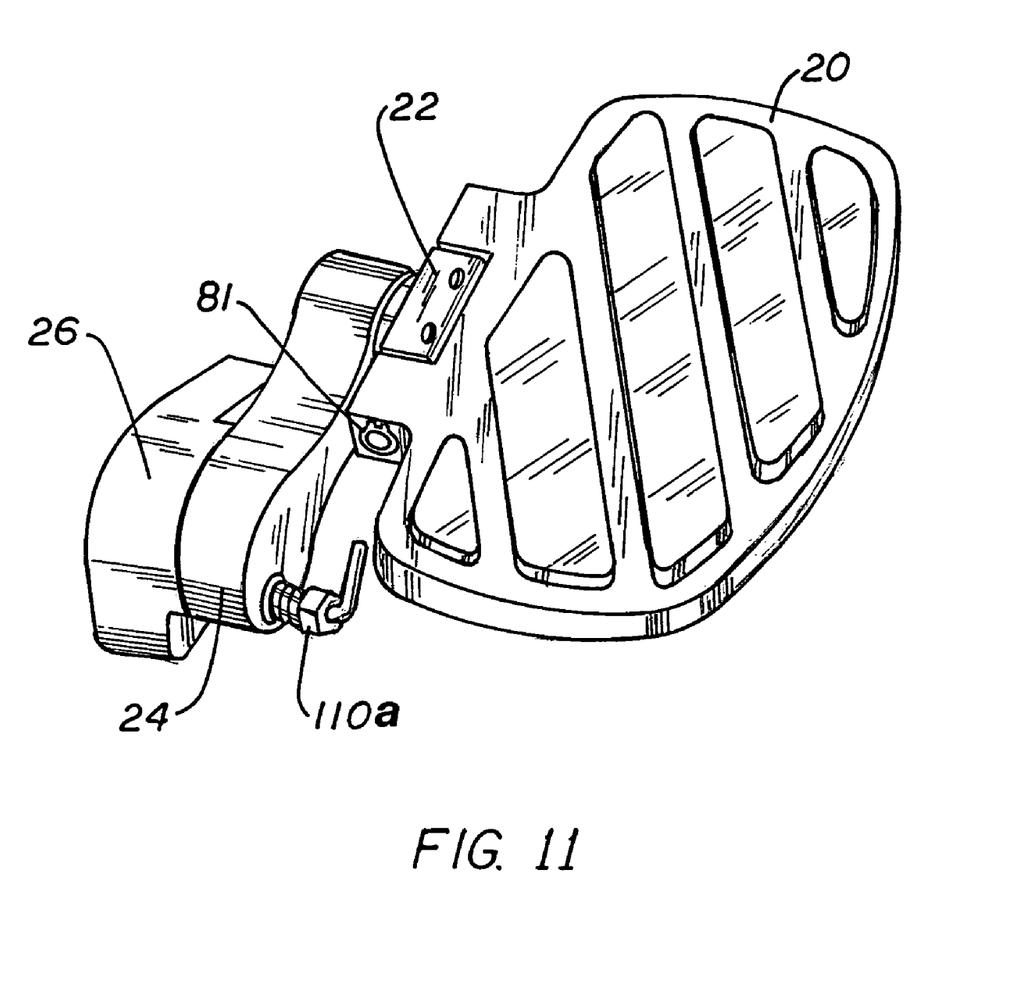
FIG. 11 is a perspective view of the footboard unit with the footboard rotated out of horizontal.

FIG. 11 illustrates another orientation possibility from this design. In instances in which for passenger's comfort, horizontality of footboard 20 is not desired, footboard plane may be set at an angle from the horizontal. Illustrated is a position combination in which positioning-arm lynch pin 100a engages arm locking hole 10c and collar lynch pin 100b engages arm locking hole 114d. In this manner, a 30° angle is obtained, allowing for flexion of the ankle, while the foot is in a position of repose on footboard 20. Of course, an orientation producing extension of the ankle while the foot is reposed on footboard 20 is available.

While the principles of the invention have been shown and described in connection with but a few embodiments, it is to be understood clearly that such embodiments are by way of example and are not limiting.

The invention claimed is:
1. A motorcycle foot support assembly comprising:
a foot support member having an upper surface and an inner surface;
a rotation arm having a first end and a second end, said second end attached with respect to the inner surface of the foot support;
a monolithic motorcycle-mounting bracket having a motorcycle-attachment portion and an arm-attachment portion, said arm attachment portion pivotably attached with respect to the rotation-arm first end; and
a releaseable bracket-to-arm locking mechanism having an engagement pin with a pin shape that selectively engages with one of a plurality of predetermined stop holes of a stop-hole shape complementary to the pin shape of a portion of the engagement pin whereby the releaseable bracket-to-arm locking mechanism may be selectively engaged to stop the relative rotation between the arm-attachment portion and the rotation-arm first end.

2. The motorcycle foot support assembly of claim 1 wherein at least three of the predetermined stop holes are arcuately located.

3. The motorcycle foot support assembly of claim 1 wherein the locking pin member is potentially biased to be engaged.

4. The motorcycle foot support assembly of claim 3 wherein the upper surface is substantially planar with a longitudinal dimension and a lateral dimension.

5. The motorcycle foot support assembly of claim 4 wherein the longitudinal dimension is parallel with a major axis of the motorcycle, and is greater than the lateral dimension.

6. The motorcycle foot support assembly of claim 5 further comprising a rotation mechanism located between the second end and the foot-support inner surface.

7. The motorcycle foot support assembly of claim 6 having a rotation-arresting mechanism for selectively arresting the rotation of the foot support member with respect to the rotation arm.

8. The motorcycle foot support assembly of claim 7 wherein the rotation-arresting mechanism has an engagement peg with a peg shape that selectively engages with one of a plurality of predetermined stop apertures of a stop-aperture shape complementary to the peg shape of a portion of the engagement peg.

9. The motorcycle foot support assembly of claim 8 wherein the engagement peg is potentially biased to be engaged.

10. The motorcycle foot support assembly of claim 9 having a rotatable retracting member between the inner surface and the rotation arm whereby an angle between a foot-support plane described by the upper surface and a motorcycle plane described by the motorcycle may be selectively decreased.

11. The motorcycle foot support assembly of claim 7 whereby a portion of the upper surface is non-slip.

12. The motorcycle foot support assembly of claim 2 further comprising a rotation mechanism located between the second end and the foot-support inner surface.

13. The motorcycle foot support assembly of claim 12 having a rotation-arresting mechanism for selectively arresting the rotation of the foot support member with respect to the rotation arm.

14. The motorcycle foot support assembly of claim 13 wherein the rotation-arresting mechanism has an engagement peg with a peg shape that selectively engages with one of a plurality of predetermined stop apertures of a stop-aperture shape complementary to the peg shape of a portion of the engagement peg.

15. The motorcycle foot support assembly of claim 14 wherein the engagement peg is potentially biased to be engaged.

16. A repositionable footboard for motorcycles of the type having a major motorcycle plane, comprising:
- a footboard portion having a planar upper surface with a longitudinal dimension parallel to the motorcycle plane and a lateral dimension that is not greater than the longitudinal dimension, and having an inner surface;
- an elongated crank having a first end and a second end, said second end rotatably attached with respect to the inner surface whereby the footboard may rotate about a footboard axis of rotation substantially orthogonal to the major motorcycle plane;
- a bracket member configured for attachment to the motorcycle, said bracket member rotatably attached with respect to the first end whereby the crank may rotate about a crank axis of rotation substantially orthogonal to the major motorcycle plane;
- a crank-to-bracket positioning mechanism for selectively and releasably locking the rotation of the crank with respect to the bracket; and
- a crank-to-footboard position mechanism for selectively and releasably locking the rotation of the footboard with respect to the crank.

17. The repositionable footboard of claim 16 wherein the footboard has a major footboard plane at a footboard-to-motorcycle angle with respect to the major motorcycle plane, further comprising a footboard retraction mechanism allowing the footboard to be selectively pivoted to change the footboard-to-motorcycle angle.

* * * * *